United States Patent
Hooli et al.

(10) Patent No.: US 9,473,281 B2
(45) Date of Patent: Oct. 18, 2016

(54) METHODS, APPARATUSES AND COMPUTER PROGRAM PRODUCTS FOR PROVIDING DYNAMIC UPLINK-DOWNLINK RECONFIGURATION INFORMATION TO USER EQUIPMENTS

(71) Applicant: Nokia Solutions and Networks Oy, Espoo (FI)

(72) Inventors: Kari J. Hooli, Oulu (FI); Esa T. Tiirola, Kempele (FI); Timo E. Lunttila, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 29 days.

(21) Appl. No.: 14/306,569

(22) Filed: Jun. 17, 2014

(65) Prior Publication Data
US 2014/0376460 A1   Dec. 25, 2014

Related U.S. Application Data

(60) Provisional application No. 61/836,898, filed on Jun. 19, 2013.

(51) Int. Cl.
*H04L 5/00* (2006.01)
*H04W 72/04* (2009.01)

(52) U.S. Cl.
CPC .......... *H04L 5/0053* (2013.01); *H04W 72/042* (2013.01); *H04W 72/0446* (2013.01)

(58) Field of Classification Search
CPC .......... H04L 35/0053; H04W 72/042; H04W 72/0446

USPC ......................................................... 370/329
See application file for complete search history.

(56) References Cited

U.S. PATENT DOCUMENTS

2010/0027456 A1* 2/2010 Onggosanusi ......... H04B 7/024
                                                          370/312
2010/0254329 A1* 10/2010 Pan .......................... H04L 5/001
                                                          370/329

(Continued)

FOREIGN PATENT DOCUMENTS

WO   WO 2012/113131 A1   8/2012

OTHER PUBLICATIONS

3GPP TS 36.211, V8.9.0, "$3^{rd}$ Generation Partnership Project; Technical Specification Group Radio Access Network Evolved Universal Terrestrial Radio Access (E-UTRA); Physical Channels and Modulation (Release 8), Section 4.2", Dec. 2009, 83 pgs.

(Continued)

*Primary Examiner* — Chi H Pham
*Assistant Examiner* — Robert Lopata
(74) *Attorney, Agent, or Firm* — Harrington & Smith

(57) ABSTRACT

A method provides information to a UE specifying a UL-DL configuration to be applied to the UE. The information is indicative of: (a) a signaling time at which a UL-DL configuration signaling for a new UL-DL configuration is to take place, and (b) an application time at which the new UL-DL configuration is to be applied. This method complements UL-DL configuration signaling by providing more reliable reception of UL-DL configuration information. This indication is performed with smaller signaling overhead compared to conventional schemes and with reasonable complexity on both the UE side and an eNB side.

42 Claims, 3 Drawing Sheets

(56) References Cited

U.S. PATENT DOCUMENTS

| | | | | |
|---|---|---|---|---|
| 2010/0290418 | A1* | 11/2010 | Nishio | H04J 13/004 370/329 |
| 2011/0269492 | A1* | 11/2011 | Wang | H04L 5/003 455/509 |
| 2012/0250641 | A1* | 10/2012 | Sartori | H04W 48/12 370/329 |
| 2012/0257552 | A1* | 10/2012 | Chen | H04L 5/001 370/280 |
| 2013/0022014 | A1* | 1/2013 | Hong | H04L 5/001 370/329 |
| 2013/0028219 | A1* | 1/2013 | Lee | H04W 74/006 370/329 |
| 2013/0114529 | A1* | 5/2013 | Chen | H04L 5/0053 370/329 |
| 2013/0153298 | A1* | 6/2013 | Pietraski | H04L 5/001 175/45 |
| 2013/0301492 | A1* | 11/2013 | Ji | H04L 5/14 370/280 |
| 2013/0336177 | A1* | 12/2013 | Gao | H04W 72/0446 370/280 |
| 2013/0336299 | A1* | 12/2013 | Lee | H04L 5/0007 370/336 |
| 2014/0003381 | A1* | 1/2014 | Lee | H04L 1/0026 370/329 |
| 2014/0010213 | A1* | 1/2014 | Wang | H04B 7/0486 370/336 |
| 2014/0133427 | A1* | 5/2014 | Kim | H04L 5/0053 370/329 |
| 2014/0161056 | A1* | 6/2014 | Moulsley | H04W 72/042 370/329 |
| 2014/0177486 | A1* | 6/2014 | Wang | H04L 5/0053 370/280 |
| 2014/0198680 | A1* | 7/2014 | Siomina | H04L 5/14 370/252 |
| 2014/0254412 | A1* | 9/2014 | Siomina | H04W 24/02 370/252 |
| 2014/0293907 | A1* | 10/2014 | Lee | H04L 5/0096 370/329 |
| 2014/0334353 | A1* | 11/2014 | Wei | H04W 72/1263 370/280 |
| 2014/0334355 | A1* | 11/2014 | Ekpenyong | H04B 1/56 370/280 |
| 2015/0003301 | A1* | 1/2015 | He | H04B 7/0452 370/280 |
| 2015/0043396 | A1* | 2/2015 | Ekpenyong | H04L 5/0094 370/280 |
| 2015/0092629 | A1* | 4/2015 | Seo | H04L 1/18 370/280 |
| 2015/0318974 | A1* | 11/2015 | Hou | H04W 72/0406 370/280 |
| 2015/0327324 | A1* | 11/2015 | Wei | H04W 52/0235 370/280 |
| 2015/0358836 | A1* | 12/2015 | Zhu | H04W 24/02 370/329 |

OTHER PUBLICATIONS

"Further Enhancements to LTE TDD for DL-UL Interference Management and Traffic Adaption", CATT, 3GPP TSG-RAN Meeting #58, RP121772, Dec. 4-7, 2012, 18 pgs.

"Signaling mechanism for TDD-UL-DL configuration", ZTE, 3GPP TSG RAN WG1 Meeting #73, R1-132109, May 20-24, 2013, 3 pgs.

"Signaling mechanisms for dynamic TDD UL/DL, Reconfiguration", Texas Instruments, 3GPP TSG RAN WG1 #73, R1-131945, May 20-24, 2013, 3 pgs.

"On the need for aiding explicit signaling", Ericsson, ST-Ericsson, 3GPP TSG-RAN WG1 #73, R1-132025, May 20-24, 2013, 2 pgs.

R1-132297, Nokia Siemens Networks, Nokia; On signalling mechanisms to support dynamic TDD UL-DL reconfiguration; 3GPP TSG-RAN WG1 Meeting #73; Fukuoka, Japan, May 20-24, 2013.

* cited by examiner

METHODS, APPARATUSES AND COMPUTER PROGRAM PRODUCTS FOR PROVIDING DYNAMIC UPLINK-DOWNLINK RECONFIGURATION INFORMATION TO USER EQUIPMENTS

CROSS-REFERENCE TO RELATED APPLICATIONS

The present application claims the benefit under 35 U.S.C. §119(e) of U.S. Provisional Patent Application No. 61/836,898, filed on Jun. 19, 2013, the disclosure of which is hereby incorporated by reference in its entirety.

TECHNICAL FIELD

The exemplary and non-limiting embodiments of this invention relate generally to wireless communication methods and apparatuses and, more specifically to methods and apparatuses for providing dynamic uplink-downlink reconfiguration information to user equipments

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
 3GPP Third Generation Partnership Project
 C-RNTI Cell RNTI
 CSI Channel State Information
 DCI Downlink Control Information
 DL, D Downlink
 DRX Discontinuous Reception
 DTX Discontinuous Transmission
 EPDCCH Enhanced Physical Downlink Control Channel
 eIMTA Enhanced Interference Management and Traffic Adaptation
 eNB Enhanced Node B (Base Station)
 F Flexible
 FDD Frequency Division Duplexing
 HARQ Hybrid Automatic Repeat Request
 L1 Layer One
 LTE Long Term Evolution
 MAC Medium Access Control
 MIB Master Information Block
 NCT New Carrier Type
 NSN Nokia Siemens Networks
 PBCH Physical Broadcast Channel
 PCFICH Physical Control Format Indicator Channel
 PDCCH Physical Downlink Control Channel
 PDSCH Physical Downlink Shared Channel
 PHY Physical Layer
 PUCCH Physical Uplink Control Channel
 PUSCH Physical Uplink Shared Channel
 RAN Radio Access Network
 Rel Release
 RNTI Radio Network Temporary Identifier
 RRC Radio Resource Control
 S Special
 SFN System Frame Number
 SIB-1 System Information Block #1
 TDD Time Division Duplexing
 TD-LTE Time Division (TDD) LTE
 UE User Equipment
 UL, U Uplink
 WG Working Group Release 12 of the Third Generation Partnership Project (3GPP) Long Term Evolution (LTE) standard deals with LTE-Advanced systems. Techniques for dynamic uplink-downlink (UL-DL) reconfiguration fall within the scope of a 3GPP Release 12 Work Item entitled, "Further Enhancements to LTE TDD for DL-UL Interference Management and Traffic Adaptation", referred to hereinafter as "eIMTA."

Conventional techniques for performing dynamic UL-DL reconfiguration have shortcomings. For example, the UE may not have reliable information regarding the UL-DL configuration that the UE is supposed to use at the time when the reconfiguration should be applied. Moreover, it is difficult or impractical to optimize conventional solutions for different scenarios. For example, signaling overhead is not minimized in a typical scenario where the switching periodicity applied by the network is on the order of tens of milliseconds. Hence, there is a clear need for more advanced solutions for performing dynamic UL-DL reconfiguration.

SUMMARY OF SOME EMBODIMENTS

According to a first set of exemplary embodiments of the invention, a method comprises generating information that is indicative of: (a) a signaling time at which an uplink-downlink configuration signaling for a new uplink-downlink configuration is to take place, and (b) an application time at which the new uplink-downlink configuration is to be applied; and providing the generated information to a user equipment, wherein the generated information specifies the new uplink-downlink configuration to be applied to the user equipment. This method complements UL-DL configuration signaling by providing more reliable reception of UL-DL configuration information. This indication is performed with smaller signaling overhead compared to conventional schemes and with reasonable complexity on both the UE side and an eNB side.

According to a second set of exemplary embodiments of the invention, an apparatus comprises one or more processors and one or more memories including computer program code, the one or more memories and the computer program code configured, with the one or more processors, to cause the apparatus to perform generating information that is indicative of: (a) a signaling time at which an uplink-downlink configuration signaling for a new uplink-downlink configuration is to take place, and (b) an application time at which the new uplink-downlink configuration is to be applied; and providing the generated information to a user equipment, wherein the generated information specifies the new uplink-downlink configuration to be applied to the user equipment.

According to a third set of exemplary embodiments of the invention, a computer program product comprises a computer-readable storage medium bearing computer program code embodied therein for use with a computer, the computer program code comprising code for generating information that is indicative of: (a) a signaling time at which an uplink-downlink configuration signaling for a new uplink-downlink configuration is to take place, and (b) an application time at which the new uplink-downlink configuration is to be applied; and providing the generated information to a user equipment, wherein the generated information specifies the new uplink-downlink configuration to be applied to the user equipment.

According to a fourth set of exemplary embodiments of the invention, a method comprises receiving first information at a user equipment that is indicative of a signaling time at which an uplink-downlink configuration signaling for a new uplink-downlink configuration is to take place, and receiving second information at the user equipment that is indicative of an application time at which the new uplink-downlink configuration is to be applied; wherein the generated information specifies the new uplink-downlink configuration to be applied to the user equipment.

According to a fifth set of exemplary embodiments of the invention, an apparatus comprises one or more processors and one or more memories including computer program code, the one or more memories and the computer program code configured, with the one or more processors, to cause the apparatus to perform receiving first information at a user equipment that is indicative of a signaling time at which an uplink-downlink configuration signaling for a new uplink-downlink configuration is to take place, and receiving second information at the user equipment that is indicative of an application time at which the new uplink-downlink configuration is to be applied; wherein the generated information specifies the new uplink-downlink configuration to be applied to the user equipment.

According to a sixth set of exemplary embodiments of the invention, a computer program product comprises a computer-readable storage medium bearing computer program code embodied therein for use with a computer, the computer program code comprising code for receiving first information at a user equipment that is indicative of a signaling time at which an uplink-downlink configuration signaling for a new uplink-downlink configuration is to take place, and receiving second information at the user equipment that is indicative of an application time at which the new uplink-downlink configuration is to be applied; wherein the generated information specifies the new uplink-downlink configuration to be applied to the user equipment.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

FIG. 3 is an exemplary data structure diagram used to perform time division duplexing uplink-downlink reconfiguration signaling according to a set of exemplary embodiments of the present invention;

DETAILED DESCRIPTION

One goal of the 3GPP Release 12 Work Item entitled, "Further Enhancements to LTE TDD for DL-UL Interference Management and Traffic Adaptation" (hereinafter, "eIMTA"), is to enable a more flexible time division duplexing (TDD) UL-DL reconfiguration. One purpose of this reconfiguration is to provide traffic adaptation which may be used, for example, in the context of small cells. As a starting point, the UL-DL configuration of an enhanced Node B (eNB) will vary relatively frequently for those UEs configured to perform a flexible UL/DL mode, as compared to the presently existing situation where the UL-DL configuration is quite stationary and fixed over time. A predefined cell-specific UL-DL configuration is broadcast in the cell using a System Information Block #1 (SIB-1). Legacy user equipments (UEs) configured to operate in accordance with any of the 3GPP Release 8 through Release 11 standards follow this predefined configuration at all times.

Release 12 of 3GPP does not introduce any new TDD UL-DL configurations. Rather, Flexible (Flex) TDD reconfiguration occurs among the seven presently-existing configurations described in 3GPP TS 36.211, Section 4.2, version 8.9.0 (Release-8). TDD reconfiguration can occur with (at most) radio frame periodicity for those UEs configured to implement the Flex configuration. Typically, radio frame periodicity may, but need not, be on the order of 10 milliseconds. The introduction of additional or alternative TDD UL-DL configurations may be considered as well. Such additional or alternative configurations are well within the scope of the present invention.

Figure 1:
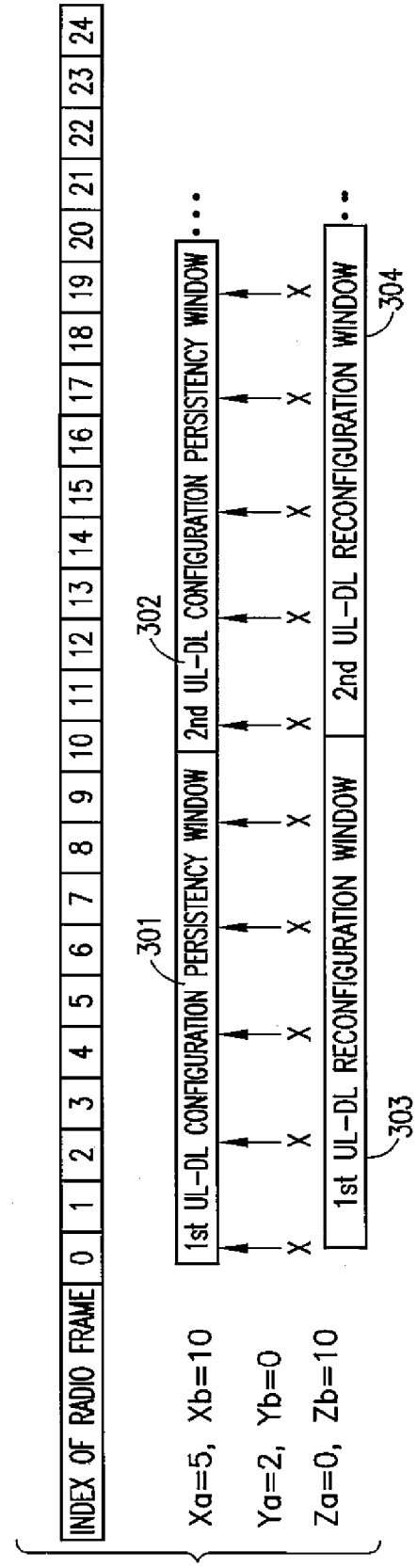
FIG. 1 is a data structure diagram showing an illustrative radio frame that includes a plurality of subframes.

FIG. 1 is a data structure diagram showing an illustrative radio frame that includes a plurality of subframes 0-9 for each of an exemplary SIB-1 configuration #0 and a Flexible (Flex) configuration. The Flex configuration is made available to Release 12 UEs that are configured to implement a flexible UL-DL mode. In each UL-DL configuration there are fixed subframes where the link direction is always predetermined. These fixed subframes are denoted as Downlink (D), Special (S) and Uplink (U) Additionally, there are flexible (F) subframes. These F subframes may be used as either D subframes or U subframes. The number of F subframes that are provided may depend on the specifics of a given scenario (e.g. by an SIB-1 configuration under consideration). Accordingly, the SIB-1 configured UL-DL configuration of FIG. 1 defines whether a given subframe 0-9 in the radio frame is downlink, special, or uplink subframe. In the case of flexible TDD UL-DL configurations, some of the uplink subframes can be changed into downlink subframes. Furthermore, in one embodiment, the $6^{th}$ subframe (Special subframe) may be changed into a downlink subframe only, but not into an uplink subframe. This has been assumed in the example of FIG. 1. In another scenario, the $6^{th}$ subframe (Special subframe) may be considered as a fixed subframe (S).

The exact signaling mechanism that will be used to indicate the UL-DL configuration of FIG. 1 remains to be decided. However, several candidate signaling mechanisms were discussed at the Radio Access Network Working Group (RAN WG) #72bis meeting. These candidate mechanisms include a signaling mechanism which explicitly or implicitly indicates TDD UL-DL reconfiguration by either Physical Layer (PHY) signaling (not including Physical Broadcast Channel/Master Information block (PBCH/MIB) signaling), or Medium Access Control (MAC) signaling. However, PBCH/MIB-based signaling could be revisited if there are reliability issues with regard to PHY or MAC signaling. As used herein, the term "PHY signaling" encompasses UE specific or UE common signaling, as well as using either existing or newly defined Downlink Control Information (DCI) formats.

Additional details of candidate signaling mechanisms were discussed at the Radio Access Network Working Group One (RAN WG1) #73 meeting in May of 2013. These details included explicit Layer One (L1) signalling of reconfiguration by a UE-group-common Enhanced Physical Downlink Control Channel (EPDCCH) or PDCCH. As used herein, the term "PDCCH" may refer to one or both of EPDCCH or PDCCH. Similarly, the term "EPDCCH" may refer to one or both of PDCCH or EPDCCH. At the RAN WG1 #73 meeting, many items were identified as requiring further study or analysis. These items included the search space to be used for this signaling, the formulation of a fallback solution that can be used to improve the reliability and robustness of an explicit solution, and the necessary UL scheduling timing and HARQ timing signaling. Any solution should attempt to avoid additional blind decodes.

The signaling mechanisms considered for UL-DL reconfiguration may be classified as common PHY signaling methods and dedicated PHY signaling methods. Common PHY signaling may be based on a specific DCI scrambled with a new Radio Network Temporary Identifier (RNTI), such as a Flex-TDD-RNTI. An actual indication of the TDD UL-DL configuration may be included in the payload of the DCI. This technique is the baseline solution that was formulated at the RAN WG1 #73 meeting.

Dedicated PHY signaling may, but need not, be explicit. Pursuant to explicit dedicated PHY signaling, a new bit field of two or three bits is added into a UL and/or DL grant to indicate the UL-DL configuration in the subsequent radio frame. This signaling is used to aid UE blind decoding as well as Channel State Information (CSI) measurement during flexible subframes. By contrast, implicit dedicated signaling uses an implicit indication that corresponds to an eNB-scheduling-based approach. Namely, in the case of a scheduled Physical Uplink Control Channel (PUCCH) or Physical Uplink Shared Channel (PUSCH) transmission, the UE considers that the subframe is used for UL transmission; otherwise, UE has to assume that the subframe is used for DL transmission and will try to detect the EPDCCH/PDCCH. Based on decisions made at the RAN WG1 #73 meeting, dedicated PHY signaling can be considered as a complementary solution to the common PHY approach.

All of the aforementioned signaling mechanisms, including dedicated PHY signaling and common PHY signaling, have disadvantages. When using common signaling for dynamic UL-DL reconfiguration, an explicit indicator is transmitted periodically by the group common PDCCH or EPDCCH. One of the disadvantages of this approach is that all UEs configured to flexible TDD mode need to decode common signaling to obtain the current UL-DL configuration. This will have some impact on UEs' power consumption as well as PDCCH/EPDCCH overhead. On the other hand, the UEs in discontinuous receive (DRX) mode and will not be able to decode the periodic signaling. When the UE wakes up, the UE needs to follow the SIB-1 defined UL-DL configuration and is able to do so, as long as the UE is able to detect the common UL-DL configuration indication in the specific downlink subframe (e.g., Subframe 0).

The error rate achievable by common signaling varies between 10–3 and 10–2, depending on the exact signaling type. The error case related to common signaling is caused mainly by erroneous detection of PDCCH/EPDCCH. The related error cases are missed detection and false alarm. The main problems related to these error cases are that the eNB has no way of determining whether or not the UE has missed detection, or whether or not the UE assumes wrong information due to a false alarm.

Any of various problems may occur when the UE has an incorrect or inaccurate understanding of the current UL-DL configuration. These problems include DL and/or UL throughput loss, erroneous CSI measurement and reporting, as well as problems related to Hybrid Automatic Repeat Request (HARQ)/scheduling timing (depending on the selected signaling scheme). The time span of the error case with common signaling may involve multiple subframes, or even one or more entire radio frames, depending on the reconfiguration periodicity. Hence, the error rate of UL-DL reconfiguration signaling should be reduced to the level of 1e-5 or 1e-6, in order to minimize the consequences of the signaling errors. The problem is that a reduced error rate will introduce considerable overhead on either the DL side, the UL side, or both. Furthermore, one of the challenges related to common signaling is that, as a practical matter, it is fairly difficult to improve the reliability of the signaling. For example, it is a challenge to provide UE-specific resources in the uplink to confirm that UL-DL reconfiguration was received correctly.

When using dedicated signaling for dynamic UL-DL reconfiguration, an explicit indicator is included in the PHY signaling transmitted to the UE. The indicator may always be present in certain DCI formats. The error rate achievable by dedicated signaling is on the order of $10^{-2}$. The benefit of dedicated signalling is that the eNB may use uplink signal (PUCCH or PUSCH) to identify missed detection separately for each UL-DL reconfiguration. This indicates that the error rate of UL-DL reconfiguration signalling can be reduced to the level of $10^{-4}$ with the assumption that DTX detection at the eNB operates with error rate of 1e-2. One of the limitations related to dedicated signaling is that there may be UEs which do not have valid UL-DL configuration information available. For example, in cases where the indicator is included in the dedicated DCI, only scheduled UEs become aware of the current configuration.

Implicit signaling is a specific form of dedicated signaling where the UE determines the link direction implicitly by means of EPDCCH blind decoding. The advantages of this approach include low overhead, whereas the main challenges relate to UE power consumption due to excessive blind decoding, false-positive problems, as well as challenges related to CSI measurement & reporting.

Some companies have identified in their 3GPP contributions the potential need for mechanisms to improve the reliability of UL-DL configuration signaling. Zhongxing Telecommunication Equipment (ZTE) mentions in [R1-132109] the possibility of using explicit signaling as a complementary or enhanced function on top of implicit signaling. Texas Instruments points out in [R1-131945] that the reliability of common signaling can be improved by transmitting more than one reconfiguration signal within a notification window. For example, if the minimum UL/DL reconfiguration time is 20 ms, the same EPDCCH carrying the reconfiguration command can be repeated within a 20-millisecond window. Similar to ZTE, Ericsson considers the possibility of using both explicit and implicit signaling [R1-132025]. Explicit signaling may be used to inform the UE about valid subframes for CSI measurements to lower the number of impacted measurements.

The foregoing proposals do not provide an adequate or complete solution to the aforementioned problems. For example, the UE may not have reliable enough information on the UL-DL configuration at the time when the reconfiguration should be applied. Moreover, these existing solutions cannot be optimized for different scenarios. For example, signaling overhead is not minimized in a typical scenario where the switching periodicity applied by the network is on the order of tens of milliseconds. Hence, there is a clear need for more advanced solutions.

According to a set of exemplary embodiments of the present invention, a higher layer signaling protocol is provided to facilitate Common PHY signaling of a UL-DL reconfiguration. More specifically, the idea is to provide the UE with assistance information regarding when and how configuration signaling may take place and when the new configuration should be applied. The exemplary embodiments of the invention may include one or more of the aspects described hereinafter.

Figure 2:
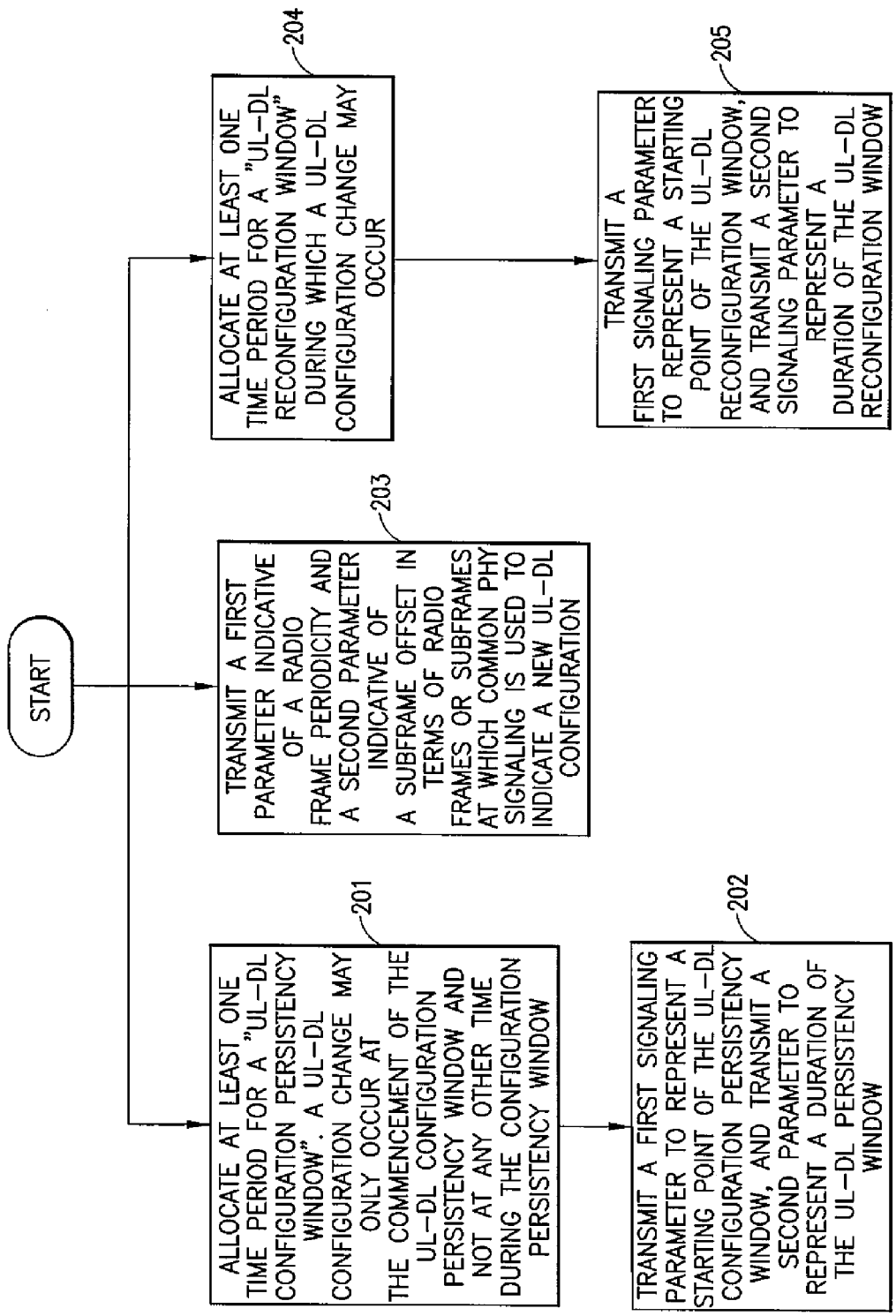
FIG. 2 is a process flow diagram that illustrates a method, and a result of execution by one or more processors of a set of computer program instructions embodied on a computer readable memory, for providing information to a user equipment specifying an uplink-downlink configuration to be applied to the user equipment according to a set of exemplary embodiments of the present invention.

FIG. 2 is a process flow diagram that illustrates a method, and a result of execution by one or more processors of a set of computer program instructions embodied on a computer readable memory, for providing information to a UE specifying a UL-DL configuration to be applied to the UE. The information is indicative of: (a) a signaling time at which a UL-DL configuration signaling for a new UL-DL configuration is to take place, and (b) an application time at which the new UL-DL configuration is to be applied. This method complements UL-DL configuration signaling by providing more reliable reception of UL-DL configuration information. This indication is performed with smaller signaling overhead compared to conventional schemes and with reasonable complexity on both the UE side and an eNB side.

The operational sequence of FIG. 2 commences at any of blocks 201, 203, or 204 as follows.

Aspect 1—Block 201:

Allocate at least one time period for a UL-DL configuration persistency window. A UL-DL configuration change to a new UL-DL configuration may only occur at the commencement of the UL-DL configuration persistency window, and not at any other time during the UL-DL configuration persistency window. The operational sequence then progresses to block 202 where a first signaling parameter is transmitted that represents a starting point of the UL-DL configuration persistency window. A second signaling parameter is transmitted that represents a duration of the UL-DL persistency window. Thus, the signaling may contain two parts: Xa, which is the starting point of the UL-DL configuration persistency window; and Xb, which is the duration of the UL-DL configuration persistency window. Candidate values for the two parameters Xa and Xb include: Xa=a period and/or an offset in terms of radio frames or subframes, e.g. {1, 2, 3, . . . }; and Xb=duration of the UL-DL configuration persistency window in terms of radio frames or subframes, e.g. {1, 2, 3, . . . }.

Pursuant to one set of further embodiments, the duration of the configuration may be infinite, i.e. the UL-DL configuration does not change at all. This unchanging configuration may be used to facilitate new carrier types, such as (but not limited to) operation with different HARQ timings.

Block 202 may be performed using higher layer signaling. The first and second signaling parameters are received by a user equipment (UE). The UE may assume that the UL-DL configuration will not change during the UL-DL configuration persistency window. The UL-DL configuration change is only allowed to occur at the beginning of the UL-DL configuration persistency window. Alternatively or additionally, the duration and/or the starting point of the persistency window may be predetermined (for example, fixed in the specification), in which case no signaling is needed.

Aspect 2—Block 203:

Transmit a first parameter indicative of a radio frame periodicity and a second parameter indicative of a subframe offset in terms of radio frames or subframes at which common PHY signalling is used (or can be used) to indicate a new UL-DL configuration. This new UL-DL configuration may be regarded as a UL-DL reconfiguration. Block 203 is applicable in situations where common signaling is used. In the case of dedicated signaling, the first and second parameters may be included into every message (e.g. DL assignment and/or UL grant). These parameters are denoted as Ya (periodicity) and Yb (offset). Common signaling to indicate the new UL-DL configuration may be transmitted multiple times within the UL-DL configuration persistency window to improve the reliability of the signalling (i.e. repetition gain). Alternatively or additionally, the periodicity could be predetermined and, in these instances, no signaling would be required.

Aspect 3—Block 204:

Allocate at least one time period for a UL-DL reconfiguration window during which a UL-DL configuration change to a new UL-DL configuration may occur. The time instances when the signaling of UL-DL reconfiguration may occur are configured via higher layer signaling. Note that the UL-DL reconfiguration window may, but need not, be of the same duration as the UL-DL configuration persistency window. The UE should preferably receive information about the new UL-DL configuration that is to be applied with some advance notice. The position (timing) on the UL-DL reconfiguration window may, but need not, be predetermined. For example, the reconfiguration window may be predetermined with respect to the UL-DL configuration persistency window. The same predetermined timing may be employed, or a fixed predetermined time offset may be employed.

Alternatively or additionally, the position on the UL-DL reconfiguration window may, but need not, be configurable. With reference to block 205, a first signaling parameter is transmitted to represent a starting point of the UL-DL reconfiguration window, and a second signaling parameter is transmitted to represent a duration of the UL-DL reconfiguration window. Thus; the position of the UL-DL reconfiguration window may be configurable by means of two parameters: Za, which specifies a possible starting point of the UL-DL reconfiguration window, and Zb, which specifies a duration of the UL-DL reconfiguration window. The first and second signaling parameters are received by the UE.

The various steps summarized in FIG. 2 may be viewed as method steps, and/or as operations that result from operation of computer program code embodied on a memory and executed by a processor, and/or as a plurality of coupled logic circuit elements constructed to carry out the associated function(s).

FIG. 3 is an exemplary data structure diagram for TDD UL reconfiguration signaling. During each of a first UL-DL reconfiguration window 303 and a second UL-DL reconfiguration window 304, there are predetermined time instances (denoted as X) when the reconfiguration signalling may be transmitted. Based on reconfiguration signalling, the UE receives the UL-DL configuration to be applied in a respective UL-DL configuration persistency window corresponding to a UL-DL reconfiguration window. For example, a first UL-DL configuration persistency window 301 corresponds to the first UL-DL reconfiguration window 303, and a second UL-DL configuration persistency window 302 corresponds to the second UL-DL reconfiguration window 304. The UE may also improve the reliability of UL-DL configuration determination by receiving multiple UL-DL reconfiguration messages at any of the times X, and illustratively combining these reconfiguration messages.

Optionally, reconfiguration window-related parameters may be shared with one or more neighboring cells. In many cases, it makes sense to align each of the UL-DL configuration persistency windows 301, 302 with one or more configuration persistency windows of one or more neighboring cells. This will minimize the number of subframes subject to cross-link interference. For this purpose, the parameters Xa and Xb may be shared with the neighboring cells. X2 interface/signaling may, but need not, be used for conveying this information.

Pursuant to a set of further embodiments of the invention, additional UL-DL reconfiguration information is sent on an as-needed basis. For example, an eNB may want to minimize the overhead due to common signaling (such as common DCI) used to convey UL-DL configuration. The resulting overhead can be controlled with parameter Ya. Likewise, the eNB may send additional (extra) indicators or information. These indicators may, but need not, be sent at the beginning of the UL-DL reconfiguration window, or in situations where a certain UE wakes up from discontinuous transmission (DTX) mode. The eNB may use a PDCCH/EPDCCH common search space for sending the additional common indicators. It is also possible to use the PDCCH/EPDCCH UE specific search space for the extra UL-DL reconfiguration indicators. In this case, only some of the UEs are able to receive the indicator. Additionally or alternatively, the eNB may also use dedicated signaling to send additional indicators. For example, UL grant or a DL assignment can be used for such purpose.

In situations where the eNB suspects that one or more UEs may have an incorrect understanding of the current UL-DL configuration, the eNB may utilize only fixed subframes to make sure that these UEs receive the scheduling information properly (eNB operation). In cases where the UE does not have valid UL-DL configuration information available, the UE may operate according to implicit signaling. In this case, the UE performs PDCCH/EPDCCH blind detection from all possible DL subframes until valid UL-DL configuration is received. Similarly, specific operation according to invalid UL-DL configurations may be applied for Channel State Information (CSI) reporting.

According to another set of further embodiments of the invention, improved error case handling is provided by formulating predefined rules for the cases where the UE has obtained multiple mutually conflicting UL-DL configurations during the UL-DL reconfiguration window as, for example, due to false positive detection. Such examples may include: Assume a UL-DL configuration having the highest number of occurrences (e.g., in the case UE has received configuration 5 twice and configuration 0 once, assume that configuration 5 is the valid configuration). Consider this as an error case. Operate according to the rules defined for the case having no valid UL-DL configuration available.

According to another set of further embodiments of the invention, common DCI is designed in such a way that CRC length is virtually increased from 16 bits by setting some of the bits or codepoints in the DCI to predetermined values. This will reduce the probability of false positive detection.

According to another set of further embodiments of the invention, improved recovery from missed configuration signaling is provided by designing common DCI to contain both current and next UL-DL configuration. An invalid UL-DL configuration field or an additional codepoint can be used when next UL-DL configuration is not yet defined. For example, since 3 bits are needed for indicating one of the 7 UL-DL configurations, there will be one redundant codepoint available for indicating that the eNB has not yet decided what the upcoming UL-DL configuration shall be. This signaling is an additional or alternative complementary technique for realizing the UL-DL configuration window. This signaling may be realized, for example, with proper setting of configuration parameters [Xa, Xb, Ya, Yb, Za, Zb].

According to another set of further embodiments, the reconfiguration window is not configured at all. Instead, only the UL-DL configuration persistency window is configured and the common DCI always contains both a current and a next UL-DL configuration (or invalid field indicating that next UL-DL configuration is not yet defined by eNB). It might be an implementation issue when the eNB is required to decide the next UL-DL configuration. In some sets of additional embodiments of the invention, there may be certain requirements set for the eNB as for when the eNB must decide upon the next UL-DL configuration.

According to another set of further embodiments of the invention, the eNB signals only an upcoming UL-DL configuration without signaling any current UL-DL configuration.

According to another set of further embodiments of the invention, one or more special configuration options are provided. For example, using three sets of parameters ([Xa, Xb, Ya, Yb, Za, Zb] allows for various specific configuration options. Examples of such configuration are described hereinafter.

Setting Xa=Za, and Xb=Zb means that the UL-DL configuration persistency window and the UL-DL reconfiguration window overlap.

Setting Xb equal to infinity corresponds to New Carrier Type scenario (flexible UL/DL traffic adaptation is not used).

Setting Xb=Za equal to infinity corresponds to a New Carrier Type scenario (flexible UL/DL traffic adaptation is not used).

Setting Xa=Za+Xb means that the UL-DL configuration persistency window and the UL-DL reconfiguration window are completely non-overlapping (assuming that Zb=Xb).

In one set of typical scenarios, Zb=Xb. In these scenarios, it may suffice to have a single configuration parameter for Zb and Xb.

According to another set of further embodiments of the invention, higher layer signaling is used for transmitting one or more parameters. As previously discussed, the configuration of Xa,Xb (UL-DL configuration persistency window), Ya,Yb (signalling channel), as well as Za,Zb (UL-DL reconfiguration window) can be performed via higher layer signalling such as, for example, Radio Resource Configuration (RRC) signalling. It is also possible to use a broadcast control channel (BCCH) as, for example, a predefined system information block to convey such information. Furthermore, some of the parameters may be fixed or depend on each other.

Illustratively, one or more network nodes or eNBs may determine timing-related parameters by means of logical operations. For example, System Frame Number (SFN) indicating the starting position of the window (e.g. Xa) is taking place in the case when the following logical operation is TRUE: If (mod(SFN, Xa)=0). Ya and Za can be derived in a similar way. Alternatively, the possible options for starting positions and the periodicities may be tabulated similar to e.g. periodic CSI reporting configuration signaling (e.g. Table 7.2.2-1A in TS 36.213). In this case it is sufficient to have only one configuration parameter for the timing of each of the three aspects (X, Y, Z).

The various embodiments of the invention described herein may be used to improve the reliability of common UL-DL reconfiguration signaling. An upcoming configuration is signaled before the actual change is to take place. Optionally, signaling may be provided which is indicative that the upcoming configuration has not yet been decided. The current configuration can also be signaled during the use of the configuration. Recovery is faster as the UE does not need to wait for the next period in case that it missed the signaling for current configuration. The techniques described herein can be used in combination with all signaling options available for dynamic UL-DL reconfiguration. The eNB has full control to trade-off between reliability and overhead. The signaling handles also coordination between neighboring cells. The signaling is optimized for the most common scenario having reconfiguration periodicity on the order of tens of milliseconds, but has flexibility to efficiently cover also shorter and longer periodicities.

Figure 4:
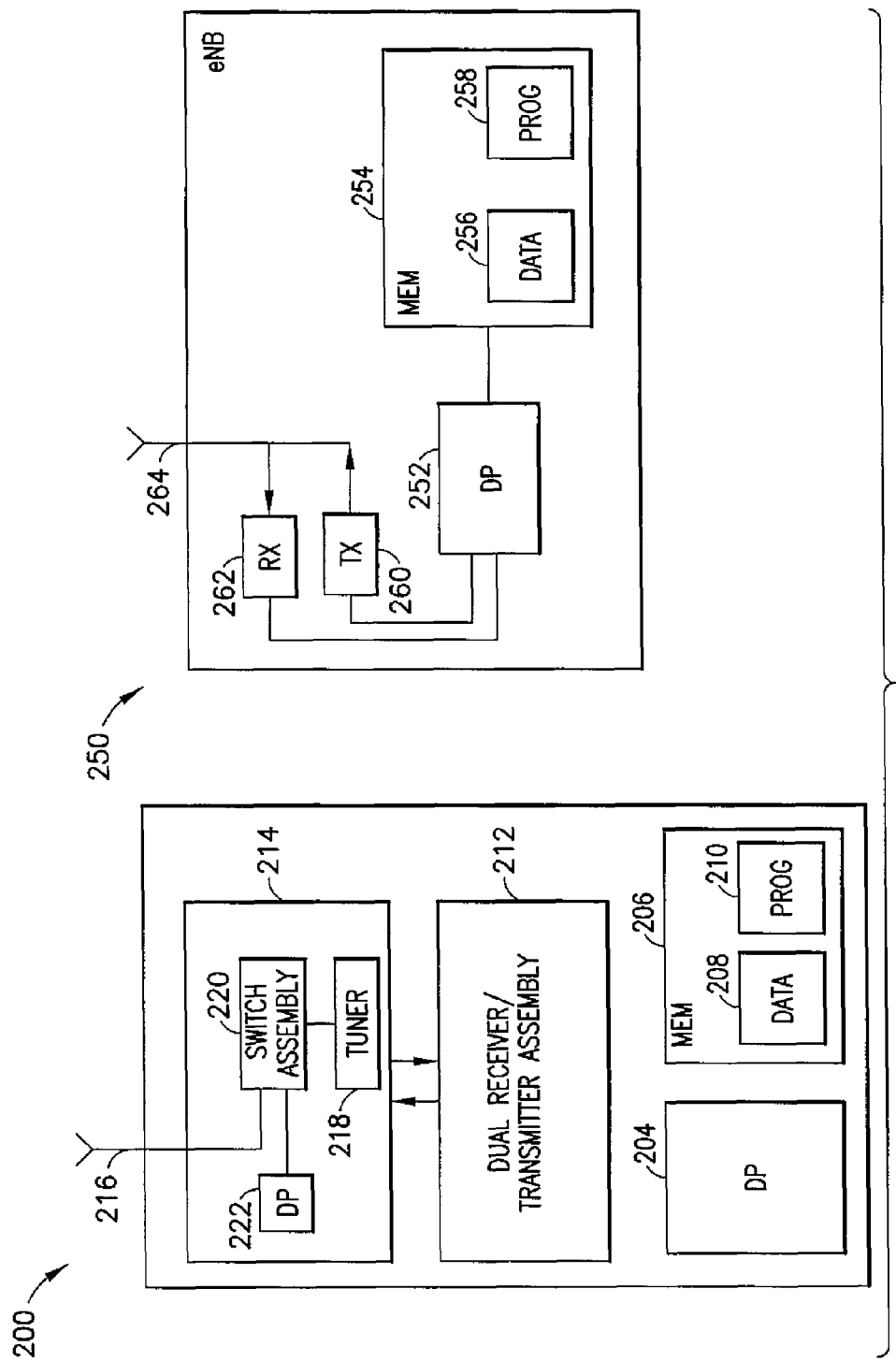
FIG. 4 illustrates a wireless communications network according to a set of exemplary embodiments of the present invention.

FIG. 4 illustrates details of a user device which may suitably be implemented as a user equipment (UE) 200, configured according to one or more embodiments of the present invention. The user device 200 comprises a data processor (DP) 204, memory (MEM) 206, with data 208 and software in the form of one or more programs 210 residing in the memory 206. The user device 200 further comprises a dual receiver/transmitter assembly 212, transmitting and receiving data using an antenna assembly 214. The antenna assembly includes an antenna 216, which may be tuned so as to cover specified frequency bands. The frequency ranges of the antenna assembly 214 may be changed by the use of an active tuner 218, which may be connected to or disconnected from the antenna 216 by a switching assembly 220 under the control of a data processor 222. A dedicated data processor 222 is illustrated here, but it will be recognized that control of the switching assembly 220 may be accomplished by the processor 204, or any other suitable processor.

FIG. 4 further illustrates a base station, suitably implemented as an eNodeB (eNB) 250. Alternatively or additionally, the base station may comprise a cellular base station, a relay station, a remote radio head, any other type of network node with wireless communication capability and which serves as an access portal enabling any of the above types of UE 200 to gain access to the wireless network of a specific type of radio access technology. The eNB 250 comprises a data processor (DP) 252 and memory (MEM) 254, with the memory storing data 256 and software in the form of one or more programs (PROGs) 258. The eNB 250 further comprises a transmitter 260 and receiver 262, for communicating with one or more devices such as the UE 200 using an antenna 264.

At least one of the PROGs 210 in the UE 200 is assumed to include a set of program instructions that, when executed by the associated DP 202, enable the device to operate in accordance with the exemplary embodiments of this invention, as detailed above. In these regards the exemplary embodiments of this invention may be implemented at least in part by computer software stored on the MEM 206, which is executable by the DP 202 of the UE 200, or by hardware, or by a combination of tangibly stored software and hardware (and tangibly stored firmware).

Similarly, at least one of the PROGs 258 in the eNB 250 is assumed to include a set of program instructions that, when executed by the associated DP 252, enable the device to operate in accordance with the exemplary embodiments of this invention, as detailed above. In these regards the exemplary embodiments of this invention may be implemented at least in part by computer software stored on the MEM 254, which is executable by the DP 252 of the eNB 250, or by hardware, or by a combination of tangibly stored software and hardware (and tangibly stored firmware). Electronic devices implementing these aspects of the invention need not be the entire devices as depicted at FIG. 2 or may be one or more components of same such as the above described tangibly stored software, hardware, firmware and DP, or a system on a chip SOC or an application specific integrated circuit ASIC.

In general, the various embodiments of the UE 200 can include, but are not limited to personal portable digital devices having wireless communication capabilities, including but not limited to cellular telephones, navigation devices, laptop/palmtop/tablet computers, digital cameras and music devices, and Internet appliances.

Various embodiments of the computer readable MEM 206 and MEM 254 include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DP 202 and the DP 252 include but are not limited to general purpose computers, special purpose computers, microprocessors, digital signal processors (DSPs) and multi-core processors.

The term "code" may be used herein to represent one or more of executable instructions, operand data, configuration parameters, or other information stored in at least one of the MEM 206 or the MEM 254. This code may include program instructions that, when executed by the associated DP 204 or 252, enable at least one of the UE 200 or the eNB 250 to operate in accordance with the exemplary embodiments of this invention as detailed herein. That is, the exemplary embodiments of this invention may be implemented at least in part by computer software executable by a processor of an electronic device, or by hardware, or by a combination of software and hardware and firmware.

In general, the various exemplary embodiments may be implemented in hardware or special purpose circuits, software, logic or any combination thereof. For example, some aspects may be implemented in hardware, while other aspects may be implemented in embodied firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, embodied software and/or firmware, special purpose circuits or logic, general purpose hardware or controller or other computing devices, or some combination thereof, where general purpose elements may be made special purpose by embodied executable software.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

While the exemplary embodiments have been described above in the context of UMTS, LTE, or GPRS electronic devices, it should be appreciated that the exemplary embodiments of this invention are not limited for use with only these particular types of wireless communication systems. Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

Various embodiments described above may be implemented in software, hardware, application logic or a combination of software, hardware and application logic. The software, application logic and/or hardware may reside on at least one memory, at least one processor, an apparatus or, a computer program product. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of an apparatus described and depicted in FIG. 4. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with other. Furthermore, if desired, one or more of the above-described functions may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments, these descriptions should not be viewed in a limiting sense. Rather, there are several variations and modifications, which may be made without departing from the scope of the present disclosure as, defined in the appended claims.

We claim:

1. A method comprising:
   generating information that is indicative of: (a) a signaling time at which an uplink-downlink configuration signaling for a new uplink-downlink configuration is to take place, and (b) an application time at which the new uplink-downlink configuration is to be applied; and
   providing the generated information to a user equipment via common physical layer signalling, wherein the generated information specifies the new uplink-downlink configuration to be applied to the user equipment in a plurality of subframes of an uplink-downlink configuration persistency window that starts at the application time, and no uplink-downlink configuration change occurs within the uplink-downlink configuration persistency window.

2. The method of claim 1 further comprising specifying the signaling time using a first parameter that is indicative of the start of the uplink-downlink configuration persistency window, and specifying the application time using a second parameter that is indicative of a duration of the uplink-downlink configuration persistency window.

3. The method of claim 1 wherein the generated information comprises a first parameter that is indicative of a radio frame periodicity or a radio subframe periodicity, and a second parameter that is indicative of a subframe offset, and wherein the subframe offset is specified in terms of frames or subframes at which the common physical layer signaling is used to indicate the new uplink-downlink configuration.

4. The method of claim 1 wherein the generated information includes one or more fixed subframes specifying an uplink, one or more fixed subframes specifying a downlink, and one or more flexible subframes each of which may be used to specify either an uplink or a downlink.

5. The method of claim 1 wherein the generated information comprises allocating at least one time period for the uplink-downlink configuration persistency window, such that an uplink-downlink configuration change may only occur at a commencement of the uplink-downlink configuration persistency window.

6. The method of claim 1 further comprising using the common physical layer signalling for performing the uplink-downlink configuration signaling, wherein the common physical layer signalling is based on a specific downlink control information (DCI) format scrambled with a Radio Network Temporary Identifier (RNTI).

7. The method of claim 6 further comprising providing an indication of the new uplink-downlink configuration in a payload of the downlink control information (DCI).

8. An apparatus comprising one or more processors and one or more memories including computer program code, the one or more memories and the computer program code configured, with the one or more processors, to cause the apparatus to perform:
   generating information that is indicative of: (a) a signaling time at which an uplink-downlink configuration signaling for a new uplink-downlink configuration is to take place, and (b) an application time at which the new uplink-downlink configuration is to be applied; and
   providing the generated information to a user equipment via common physical layer signalling, wherein the generated information specifies the new uplink-downlink configuration to be applied to the user equipment in a plurality of subframes of an uplink-downlink configuration persistency window that starts at the application time, and no uplink-downlink configuration change occurs within the uplink-downlink configuration persistency window.

9. The apparatus of claim 8, wherein the computer program code is further configured, with the one or more processors, to cause the apparatus to perform specifying the signaling time using a first parameter that is indicative of the start of the uplink-downlink configuration persistency window, and specifying the application time using a second parameter that is indicative of a duration of the uplink-downlink configuration-persistency window.

10. The apparatus of claim 8, wherein the computer program code is further configured, with the one or more processors, to cause the apparatus to perform the generating using a first parameter that is indicative of a radio frame periodicity and a second parameter that is indicative of a subframe offset; and wherein the computer program code is further configured, with the one or more processors, to cause the apparatus to specify the subframe offset in terms of frames or subframes at which the common physical layer signaling is used to indicate the new uplink-downlink configuration.

11. The apparatus of claim 8, wherein the computer program code is further configured, with the one or more processors, to cause the apparatus to perform the generating by using one or more fixed subframes specifying an uplink, one or more fixed subframes specifying a downlink, and one or more flexible subframes each of which may be used to specify either an uplink or a downlink.

12. The apparatus of claim 8, wherein the computer program code is further configured, with the one or more processors, to cause the apparatus to perform the generating by allocating at least one time period for the uplink-downlink configuration persistency window, such that an uplink-downlink configuration change may only occur at a commencement of the uplink-downlink configuration persistency window.

13. The apparatus of claim 8 wherein the common physical layer signalling is used for performing the uplink-downlink configuration signaling, and wherein the common physical layer signalling is based on a specific downlink control information (DCI) format scrambled with a Radio Network Temporary Identifier (RNTI).

14. The apparatus of claim 8 wherein an indication of the new uplink-downlink configuration is provided in a payload of the downlink control information (DCI).

15. A computer program product comprising a non-transitory computer-readable storage medium bearing computer program code embodied therein for use with a computer, the computer program code comprising code for:
generating information that is indicative of: (a) a signaling time at which an uplink-downlink configuration signaling for a new uplink-downlink configuration is to take place, and (b) an application time at which the new uplink-downlink configuration is to be applied; and
providing the generated information to user equipment via common physical layer signaling, wherein the generated information specifies the new uplink-downlink configuration to be applied to the user equipment in a plurality of subframes of an uplink-downlink configuration persistency window that starts at the application time, and no uplink-downlink configuration change occurs within the uplink-downlink configuration persistency window.

16. The computer program product of claim 15, further comprising code for specifying the signaling time using a first parameter that is indicative of the start of the uplink-downlink configuration persistency window, and specifying the application time using a second parameter that is indicative of a duration of the uplink-downlink configuration persistency window.

17. The computer program product of claim 15, further comprising code for performing the generating using a first parameter that is indicative of a radio frame periodicity and a second parameter that is indicative of a subframe offset, and further comprising code for specifying the subframe offset in terms of frames or subframes at which the common physical layer signaling is used to indicate the new uplink-downlink configuration.

18. The computer program product of claim 15, further comprising code for performing the generating by using one or more fixed subframes specifying an uplink, one or more fixed subframes specifying a downlink, and one or more flexible subframes each of which may be used to specify either an uplink or a downlink.

19. The computer program product of claim 15, further comprising code for performing the generating by allocating at least one time period for the uplink-downlink configuration persistency window, such that an uplink-downlink configuration change may only occur at a commencement of the uplink-downlink configuration persistency window.

20. The computer program product of claim 15, further comprising code for using the common physical layer signalling for performing the uplink-downlink configuration signaling, wherein the common physical signalling is based on a specific downlink control information (DCI) format scrambled with a Radio Network Temporary Identifier (RNTI).

21. The computer program product of claim 20, further comprising code for providing an indication of the new uplink-downlink configuration in a payload of the downlink control information (DCI).

22. A method comprising:
receiving first information at a user equipment that is indicative of a signaling time at which an uplink-downlink configuration signaling for a new uplink-downlink configuration is to take place, and
receiving second information at the user equipment that is indicative of an application time at which the new uplink-downlink configuration is to be applied;
wherein the first and second information is received via common physical layer signalling and specifies the new uplink-downlink configuration to be applied to the user equipment in a plurality of subframes of an uplink-downlink configuration persistency window that starts at the application time, and no uplink-downlink configuration change occurs within the uplink-downlink configuration persistency window.

23. The method of claim 22 further comprising specifying the signaling time using a first parameter that is indicative of the start of the uplink-downlink configuration persistency window, and specifying the application time using a second parameter that is indicative of a duration of the uplink-downlink configuration persistency window.

24. The method of claim 22 wherein the received first or second information further comprises a first parameter that is indicative of a radio frame periodicity or a radio subframe periodicity, and a second parameter that is indicative of a subframe offset, and wherein the subframe offset is specified in terms of frames or subframes at which the common physical layer signaling is used to indicate the new uplink-downlink configuration.

25. The method of claim 22 wherein the received first or second information further includes one or more fixed subframes specifying an uplink, one or more fixed subframes specifying a downlink, and one or more flexible subframes each of which may be used to specify either an uplink or a downlink.

26. The method of claim 22 wherein the received first or second information further comprises at least one allocated time period for the uplink-downlink configuration persistency window, such that an uplink-downlink configuration change may only occur at a commencement of the uplink-downlink configuration persistency window.

27. The method of claim 22 further comprising using the common physical layer signalling for performing the uplink-downlink configuration signaling, wherein the common physical layer signalling is based on a specific downlink control information (DCI) format scrambled with a Radio Network Temporary Identifier (RNTI).

28. The method of claim 27 further comprising receiving an indication of the new uplink-downlink configuration in a payload of the downlink control information (DCI).

29. An apparatus comprising one or more processors and one or more memories including computer program code, the one or more memories and the computer program code configured, with the one or more processors, to cause the apparatus to perform:
receiving first information at a user equipment that is indicative of a signaling time at which an uplink-downlink configuration signaling for a new uplink-downlink configuration is to take place, and
receiving second information at the user equipment that is indicative of an application time at which the new uplink-downlink configuration is to be applied;
wherein the first and second information is received via common physical layer signaling and specifies the new uplink-downlink configuration to be applied to the user equipment in a plurality of subframes of an uplink-downlink configuration persistency window that starts at the application time, and no uplink-downlink configuration change occurs within the uplink-downlink configuration persistency window.

30. The apparatus of claim 29 wherein the computer program code is further configured, with the one or more processors, to cause the apparatus to perform specifying of the signaling time using a first parameter that is indicative of the start of the uplink-downlink configuration persistency window, and specifying of the application time using a second parameter that is indicative of a duration of the uplink-downlink configuration persistency window.

31. The apparatus of claim 29 wherein the received first or second information further comprises a first parameter that is indicative of a radio frame periodicity or a radio subframe periodicity, and a second parameter that is indicative of a subframe offset, and wherein the subframe offset is specified in terms of frames or subframes at which the common physical layer signaling is used to indicate the new uplink-downlink configuration.

32. The apparatus of claim 29 wherein the received first or second information further includes one or more fixed subframes specifying an uplink, one or more fixed subframes specifying a downlink, and one or more flexible subframes each of which may be used to specify either an uplink or a downlink.

33. The apparatus of claim 29 wherein the received first or second information further comprises at least one allocated time period the uplink-downlink configuration persistency window, such that an uplink-downlink configuration change may only occur at a commencement of the uplink-downlink configuration persistency window.

34. The apparatus of claim 29 further comprising using the common physical layer signalling for performing the uplink-downlink configuration signaling, wherein the common physical layer signalling is based on a specific downlink control information (DCI) format scrambled with a Radio Network Temporary Identifier (RNTI).

35. The apparatus of claim 34 further comprising receiving an indication of the new uplink-downlink configuration in a payload of the downlink control information (DCI).

36. A computer program product comprising a non-transitory computer-readable storage medium bearing computer program code embodied therein for use with a computer, the computer program code comprising code for:
receiving first information at a user equipment that is indicative of a signaling time at which an uplink-downlink configuration signaling for a new uplink-downlink configuration is to take place, and receiving second information at the user equipment that is indicative of an application time at which the new uplink-downlink configuration is to be applied;
wherein the first and second information is received via common physical layer signaling and specifies the new uplink-downlink configuration to be applied to the user equipment in a plurality of subframes of an uplink-downlink configuration persistency window that starts at the application time and no uplink-downlink configuration change occurs within the uplink-downlink configuration persistency window.

37. The computer program product of claim 36 further comprising code for specifying the signaling time using a first parameter that is indicative of the start of the uplink-downlink configuration persistency window, and specifying the application time using a second parameter that is indicative of a duration of the uplink-downlink configuration persistency window.

38. The computer program product of claim 36 wherein the received first or second information further comprises a first parameter that is indicative of a radio frame periodicity or a radio subframe periodicity, and a second parameter that is indicative of a subframe offset, and wherein the subframe offset is specified in terms of frames or subframes at which the common physical layer signaling is used to indicate the new uplink-downlink configuration.

39. The computer program product of claim 36 wherein the received first or second information further includes one or more fixed subframes specifying an uplink, one or more fixed subframes specifying a downlink, and one or more flexible subframes each of which may be used to specify either an uplink or a downlink.

40. The computer program product of claim 36 wherein the received first or second information further comprises at least one allocated time period for the uplink-downlink configuration persistency window, such that an uplink-downlink configuration change may only occur at a commencement of the uplink-downlink configuration persistency window.

41. The computer program product of claim 36 further comprising code for using the common physical layer signalling for performing the uplink-downlink configuration signaling, wherein the common physical layer signalling is based on a specific downlink control information (DCI) format scrambled with a Radio Network Temporary Identifier (RNTI).

42. The computer program product of claim 41 further comprising receiving an indication of the new uplink-downlink configuration in a payload of the downlink control information (DCI).

* * * * *